US011404742B2

(12) United States Patent
Tamaru et al.

(10) Patent No.: US 11,404,742 B2
(45) Date of Patent: Aug. 2, 2022

(54) BATTERY MODULE

(71) Applicant: KABUSHIKI KAISHA TOYOTA JIDOSHOKKI, Kariya (JP)

(72) Inventors: Kojiro Tamaru, Kariya (JP); Taku Inoue, Kariya (JP); Hiroki Maeda, Kariya (JP); Tsuyoshi Mariya, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 176 days.

(21) Appl. No.: 16/970,128

(22) PCT Filed: Jan. 23, 2019

(86) PCT No.: PCT/JP2019/002109
§ 371 (c)(1),
(2) Date: Aug. 14, 2020

(87) PCT Pub. No.: WO2019/187554
PCT Pub. Date: Oct. 3, 2019

(65) Prior Publication Data
US 2020/0403200 A1 Dec. 24, 2020

(30) Foreign Application Priority Data
Mar. 27, 2018 (JP) .............................. JP2018-059415

(51) Int. Cl.
*H01M 50/317* (2021.01)
(52) U.S. Cl.
CPC ................................ *H01M 50/317* (2021.01)

(58) Field of Classification Search
None
See application file for complete search history.

(56) References Cited

U.S. PATENT DOCUMENTS

2005/0260493 A1\* 11/2005 Frederiksson ...... H01M 10/044
29/623.2
2014/0349147 A1 11/2014 Shaffer, II et al.
2015/0140376 A1 5/2015 Shaffer, II et al.

FOREIGN PATENT DOCUMENTS

| JP | 2006-508518 A | 3/2006 |
| JP | 2010287451 A | 12/2010 |
| JP | 2014-534582 A | 12/2014 |

(Continued)

OTHER PUBLICATIONS

Communication dated Mar. 25, 2021, from the Indian Patent Office in Application No. 202017035931.

(Continued)

*Primary Examiner* — Wyatt P McConnell
(74) *Attorney, Agent, or Firm* — Sughrue Mion, PLLC

(57) ABSTRACT

A battery module includes an electrode laminate including a plurality of electrodes that are laminated, and a sealing body sealing a side surface of the electrode laminate. The sealing body is provided with a communication hole communicating an internal space between the electrodes adjacent in a laminating direction in the electrode laminate. The communication hole includes an opening end on an outer surface of the sealing body. A length of the opening end in the laminating direction is longer than a length of the internal space in the laminating direction.

20 Claims, 9 Drawing Sheets

(56) References Cited

FOREIGN PATENT DOCUMENTS

JP        2018-018673 A    2/2018
WO        2004/051767 A1   6/2004

OTHER PUBLICATIONS

International Preliminary Report on Patentability (IPRP) with a Translation of Written Opinion in International Application No. PCT/JP2019/002109, dated Sep. 29, 2020.

* cited by examiner

BATTERY MODULE

CROSS REFERENCE TO RELATED APPLICATIONS

This application is a National Stage of International Application No. PCT/JP2019/002109, filed Jan. 23, 2019, claiming priority to Japanese Patent Application No. 2018-059415, filed Mar. 27, 2018, the contents of all of which are incorporated herein by reference in their entirety.

TECHNICAL FIELD

An aspect of the present invention relates to a battery module.

BACKGROUND ART

A bipolar battery (battery module) including bipolar electrodes in which a positive electrode is formed on one surface of a current collector and a negative electrode is formed on the other surface of the current collector is known (refer to Patent Literature 1). In the battery, an electrolytic solution is sealed in an internal space formed by a separator, a current collector, and a sealing material. The bipolar electrodes are laminated through an electrolyte layer constituted by the separator impregnated with the electrolytic solution. The battery is provided with a tube that penetrates through the sealing material. One end of the tube faces an internal space, and the other end faces an external space of the battery. A gas generated in the internal space is discharged to the outside of the battery through the tube.

CITATION LIST

Patent Literature

Patent Literature 1: Japanese Unexamined Patent Publication No. 2010-287451

SUMMARY OF INVENTION

Technical Problem

By the way, as a configuration of the battery module, for example, when forming the sealing material on a side surface of a laminate of the bipolar electrodes by injection molding, a configuration in which a nest is used to provide a communication hole communicating with an internal space between a pair of bipolar electrodes adjacent in a laminating direction is considered. The communication hole functions as a liquid injection port through which an electrolytic solution is injected, and also functions as a connection port of a safety valve for carrying out pressure adjustment of the internal space. In the case of providing the safety valve in the battery module, it is necessary to prevent the communication hole from being clogged.

An object of an aspect of the invention is to provide a battery module capable of suppressing clogging of a communication hole.

Solution to Problem

A battery module according to an aspect of the invention includes an electrode laminate including a plurality of electrodes that are laminated, and a sealing body sealing a side surface of the electrode laminate. The sealing body is provided with a communication hole communicating an internal space between the electrodes adjacent in a laminating direction in the electrode laminate. The communication hole includes an opening end on an outer surface of the sealing body. A length of the opening end in the laminating direction is longer than a length of the internal space in the laminating direction.

In the battery module, the communication hole provided in the sealing body includes the opening end on the outer surface of the sealing body. The length of the opening end in the laminating direction is longer than the length of the internal space between electrodes in the laminating direction. Accordingly, when providing a safety valve, it is possible to further suppress clogging of the communication hole in comparison to a case where the length of the opening end in the laminating direction is the same as the length of the internal space between electrodes in the laminating direction.

The communication hole may include a tapered portion in which the length of the communication hole in the laminating direction becomes longer toward the opening end. In this case, an inner surface of the communication hole can be a smooth surface with few steps or corners. Accordingly, injection of the electrolytic solution can be easily performed.

The sealing body may include a plurality of primary seals respectively provided in edge portions of the electrodes, and a secondary seal provided around the plurality of primary seals. The tapered portion may be provided in the secondary seal. In this case, for example, when forming the secondary seal by injection molding, the tapered portion can be easily formed by using a nest.

The battery module may further include a first protrusion provided on the outer surface along the opening end. In this case, for example, the first protrusion may be joined to the safety valve by melting the first protrusion.

The battery module may further include a second protrusion spaced apart from the opening end and protruding from the outer surface. In this case, for example, it is possible to easily position the battery module with respect to a jig.

The sealing body may be provided with a recess that is spaced apart from the opening end and is recessed from the outer surface. In this case, for example, it is possible to easily position the battery module with respect to a jig.

The sealing body may be provided with a plurality of the communication holes communicating with a plurality of the internal spaces different from each other in a manner of dividing into a plurality of sets. In the sealing body, regions in which the sets of the communication holes are provided may be aligned along edge portions of the electrodes. In the regions, arrangements of a plurality of the opening ends of the communication holes constituting the sets may match each other. In this case, the shape of the safety valve provided in each of the regions can be made common.

Advantageous Effects of Invention

According to the aspect of the invention, clogging of the communication holes can be suppressed.

DESCRIPTION OF EMBODIMENTS

Figure 1:
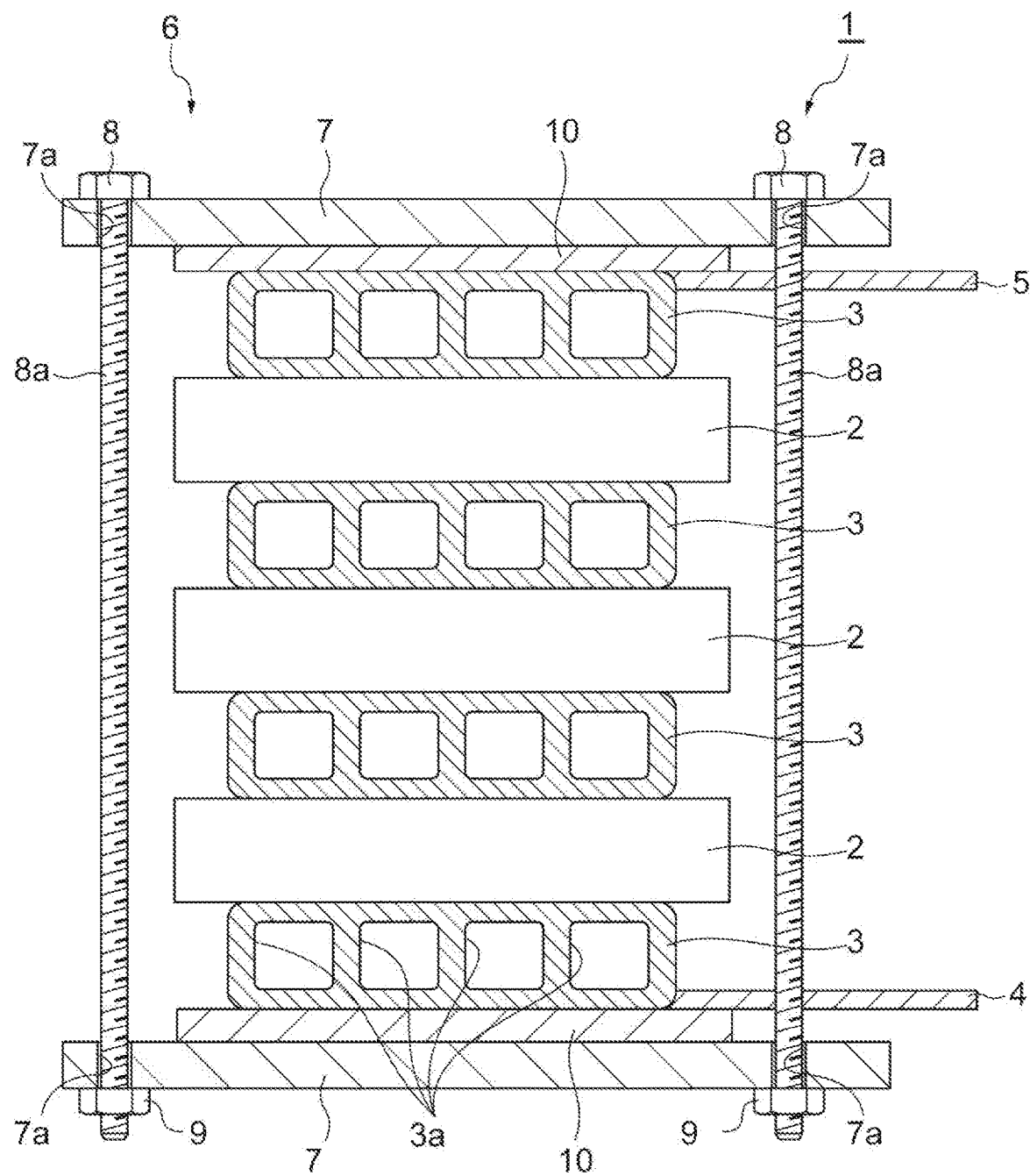
FIG. 1 is a schematic cross-sectional view illustrating a power storage device including a battery module according to an embodiment.

Hereinafter, an embodiment of the invention will be described in detail with reference to the accompanying drawings. In description, the same reference numeral will be given to the same element, or elements having the same function, and redundant description thereof will be omitted.

FIG. 1 is a schematic cross-sectional view illustrating a power storage device including a battery module according to an embodiment. In FIG. 1, a power storage device 1 is used, for example, as batteries of vehicles such as a forklift, a hybrid vehicle, and an electric vehicle. The power storage device 1 includes a plurality of (here, three) battery modules 2. For example, the battery modules 2 are nickel-hydrogen secondary batteries.

The plurality of battery modules 2 are laminated through a metal conductive plate 3. The conductive plate 3 is also disposed on an outer side of the battery modules 2 located on both ends in a laminating direction (Z-axis direction). For example, the battery modules 2 and the conductive plates 3 have a rectangular shape (rectangular shape in plan view) when viewed from the laminating direction. Each of the conductive plates 3 is electrically connected to the battery modules 2 adjacent to each other. According to this, the plurality of battery modules 2 are connected in series in the laminating direction.

A positive electrode terminal 4 is connected to the conductive plate 3 located at one end (here, a lower end) in the laminating direction. A negative electrode terminal 5 is connected to the conductive plate 3 located at the other end (here, an upper end) in the laminating direction. The positive electrode terminal 4 and the negative electrode terminal 5 extend in a direction (X-axis direction) orthogonal to the laminating direction. As the positive electrode terminal 4 and the negative electrode terminal 5 are provided, it is possible to perform charge and discharge of the power storage device 1.

The conductive plate 3 can also function as a heat dissipation plate for dissipating heat generated in the battery modules 2. A plurality of cavities 3a extending in a direction (Y-axis direction) orthogonal to the laminating direction and the extending direction of the positive electrode terminal 4 and the negative electrode terminal 5 are provided in the conductive plate 3. Because a coolant such as air passes through the cavities 3a, heat from the battery modules 2 can be efficiently dissipated to the outside.

In addition, the power storage device 1 includes a binding unit 6 that binds the battery modules 2 and the conductive plates 3 in the laminating direction. The binding unit 6 includes a pair of binding plates 7 between which the battery modules 2 and the conductive plates 3 are sandwiched in the laminating direction, and a plurality of sets of bolts 8 and nuts 9 for fastening the binding plates 7 to each other.

The binding plates 7 are formed from a metal such as iron. An insulating film 10 such as a resin film is disposed between the binding plates 7 and the conductive plates 3. For example, the binding plates 7 and the insulating film 10 have a rectangular shape in plan view. In a state in which a shaft portion 8a of each of the bolts 8 is inserted into an insertion hole 7a provided in each of the binding plates 7, when each of the nuts 9 is screwed to a tip end portion of the shaft portion 8a, a binding load in the laminating direction is applied to the battery modules 2, the conductive plates 3, and the insulating film 10.

Figure 2:
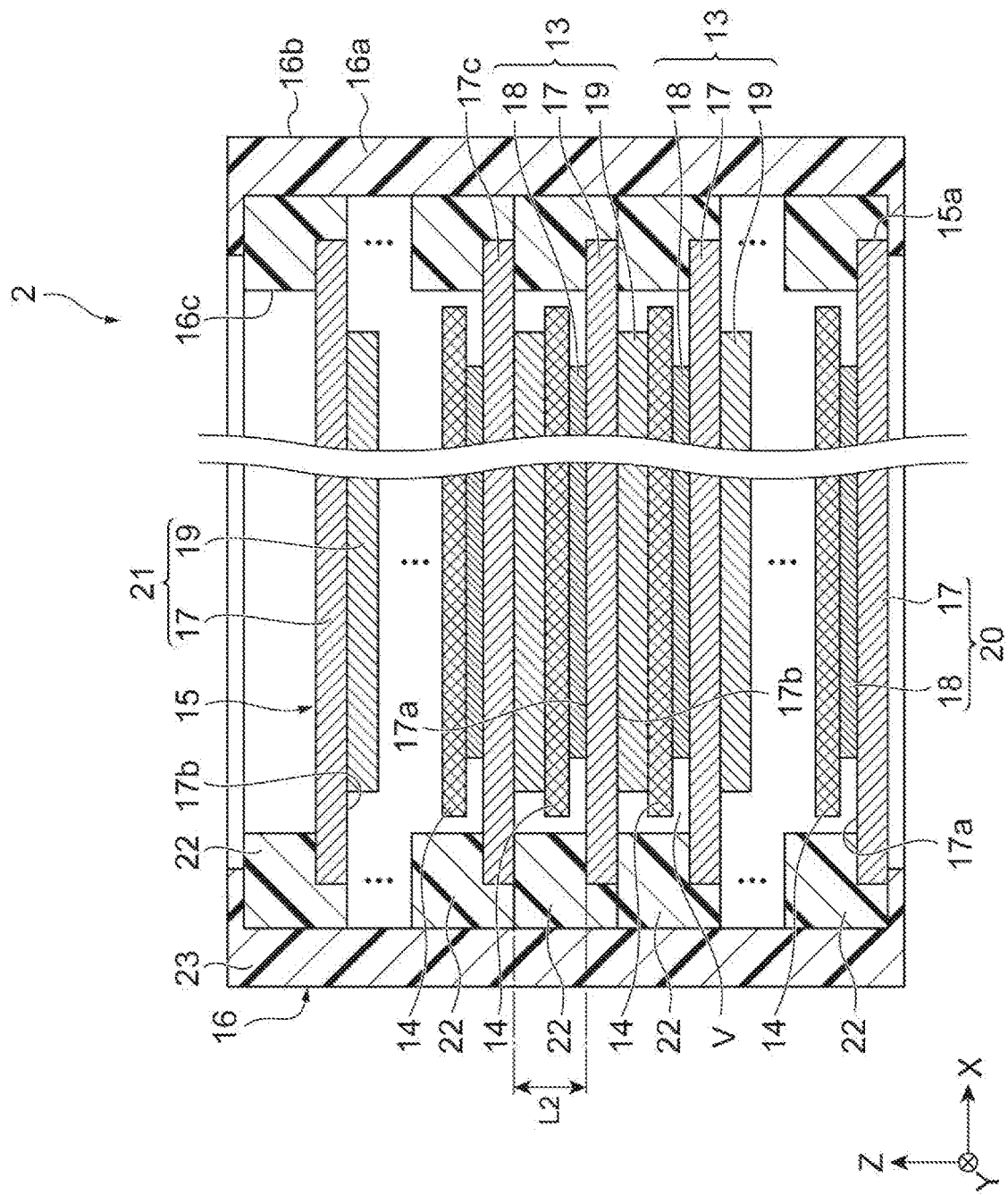
FIG. 2 is a schematic cross-sectional view of the battery module.
Figure 3:
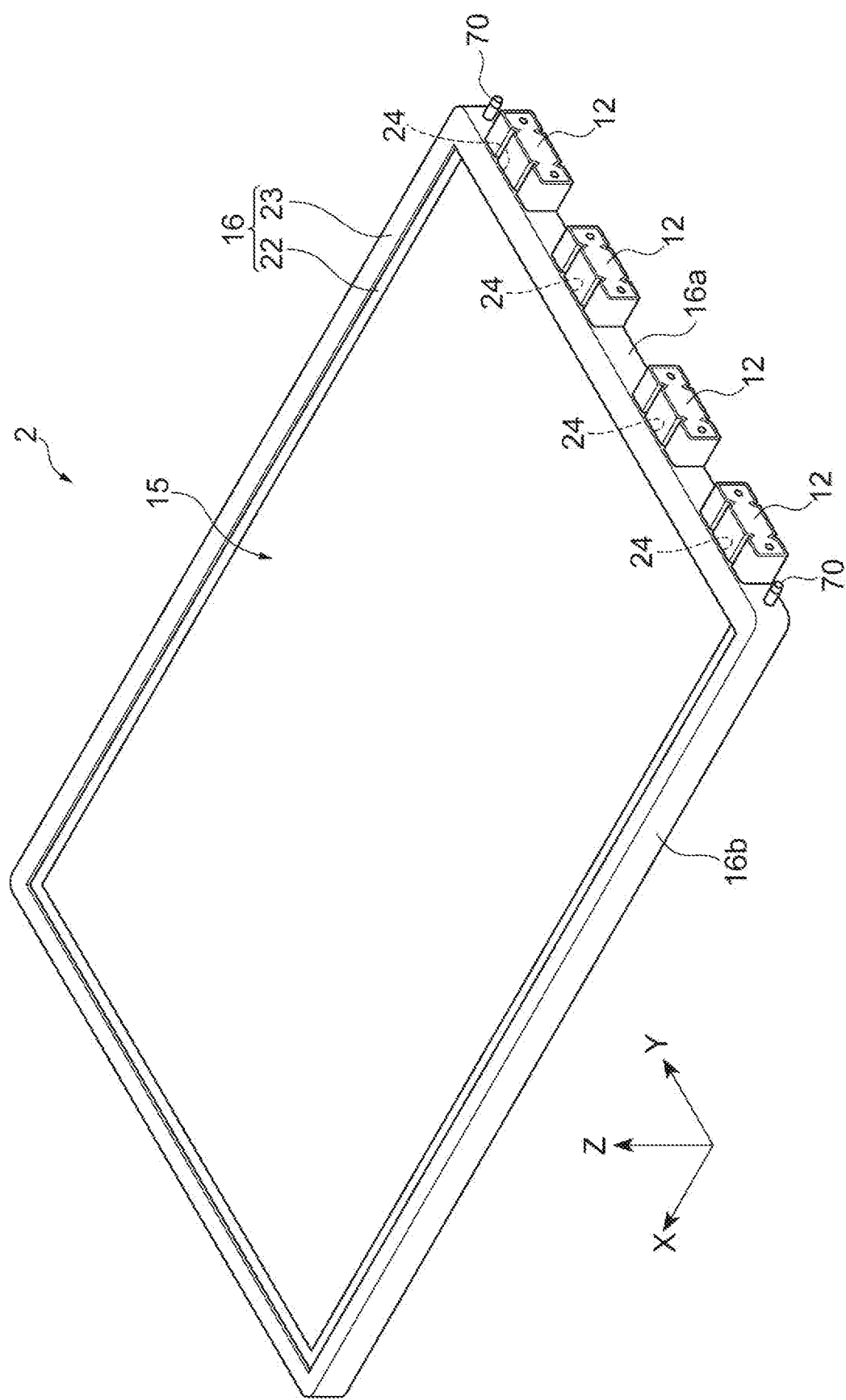
FIG. 3 is a schematic perspective view of the battery module in which a safety valve is provided.

FIG. 2 is a schematic cross-sectional view of the battery module 2. FIG. 3 is a schematic perspective view of the battery modules 2 provided with a safety valve 12. In FIG. 2 and FIG. 3, each of the battery modules 2 includes a structure (multi-cell structure) in which a plurality of (here, twenty four) cells are laminated. The battery module 2 includes an electrode laminate 15 that includes a plurality of bipolar electrodes 13 laminated through a separator 14, and a sealing body 16 that seals a side surface 15a of the electrode laminate 15. A plurality of (here, four) safety valves 12 are provided in the battery module 2.

For example, the bipolar electrodes 13 and the separator 14 have a rectangular shape in plan view. The separator 14 is disposed between the bipolar electrodes 13 adjacent to each other in the laminating direction. Each of the bipolar electrodes 13 includes nickel foil 17 that is a current collector, a positive electrode 18 that is formed on an upper surface 17a (one surface) of the nickel foil 17, and a negative electrode 19 that is formed on a lower surface 17b (the other surface) of the nickel foil 17.

The positive electrode 18 of one bipolar electrode 13 faces the negative electrode 19 of the bipolar electrode 13 adjacent thereto on one side in the laminating direction with the separator 14 interposed therebetween. The negative electrode 19 of one bipolar electrode 13 faces the positive electrode 18 of the bipolar electrode 13 adjacent thereto on the other side in the laminating direction with the separator 14 interposed therebetween.

A positive electrode side terminal electrode 20 is disposed in the lowermost layer of the electrode laminate 15. The positive electrode side terminal electrode 20 includes nickel foil 17 and a positive electrode 18 formed on an upper surface 17a of the nickel foil 17. A negative electrode side terminal electrode 21 is disposed in the uppermost layer of the electrode laminate 15. The negative electrode side terminal electrode 21 includes nickel foil 17 and a negative electrode 19 formed on a lower surface 17b of the nickel foil 17. The positive electrode 18 of the positive electrode side terminal electrode 20 faces the negative electrode 19 of the bipolar electrode 13 in the lowermost layer with the separator 14 interposed therebetween. The negative electrode 19 of the negative electrode side terminal electrode 21 faces the positive electrode 18 of the bipolar electrode 13 in the uppermost layer with the separator 14 interposed therebetween. Each nickel foil 17 of the positive electrode side terminal electrode 20 and the negative electrode side terminal electrode 21 is connected to the conductive plate 3 adjacent in the laminating direction (refer to FIG. 1).

The positive electrode 18 is formed by coating one surface of the nickel foil 17 with a positive electrode active material. As the positive electrode active material, for example, nickel hydroxide coated with cobalt (Co) oxide is used. The negative electrode 19 is formed by coating the other surface of the nickel foil 17 with a negative electrode active material. As the negative electrode active material, for example, a hydrogen storage alloy is used. An edge portion 17c of the nickel foil 17 is an uncoated region that is not coated with the positive electrode active material or the negative electrode active material. The edge portion 17c constitutes an edge portion of the bipolar electrode 13.

The separator 14 is disposed between the positive electrode 18 and the negative electrode 19, and isolates the positive electrode 18 and the negative electrode 19 from each other. The separator 14 is smaller than the nickel foil 17 and is greater than the positive electrode 18 and the negative electrode 19 when viewed from the laminating direction. For example, the separator 14 is formed in a sheet shape. The separator 14 is formed with a porous film formed from a polyolefin-based resin such as polyethylene (PE) and polypropylene (PP), or woven or nonwoven fabric formed from PE, PP, polyethylene terephthalate (PET), methyl cellulose, or the like. The separator 14 may be reinforced with a vinylidene fluoride resin compound or the like. The shape of the separator 14 is not particularly limited to the sheet shape, and may be a bag shape.

The sealing body 16 is disposed around the electrode laminate 15. The sealing body 16 includes a plurality of primary seals 22 and a secondary seal 23. Each of the primary seals 22 is provided in the edge portion 17c of each nickel foil 17. The primary seal 22 holds the edge portion 17c of the nickel foil 17. The primary seal 22 is disposed for every nickel foil 17 along the laminating direction. The primary seal 22 is formed in a frame shape. The primary seal 22 is bonded to the edge portion 17c of the nickel foil 17 with heat welding.

In the electrode laminate 15, an internal space V constituted by the nickel foil 17, the positive electrode 18, the negative electrode 19, and the primary seal 22 is provided between two pieces of the nickel foil 17 which are adjacent to each other in the laminating direction (Z-axis direction). Accordingly, a plurality of (here, twenty four) internal spaces V are provided in the electrode laminate 15. An alkali electrolytic solution is injected to the internal space V including the inside of the separator 14. As the alkali electrolytic solution, for example, an alkali solution containing a potassium hydroxide aqueous solution or the like is used. The primary seals 22 seal the internal spaces V. Each cell of the battery module 2 is constituted by two pieces of the nickel foil 17, the positive electrode 18, the negative electrode 19, the separator 14, and the primary seal 22, and includes the internal space V.

The secondary seal 23 is provided around the plurality of primary seals 22. The secondary seal 23 has a square tubular shape. The secondary seal 23 further seals the internal space V. The secondary seal 23 is bonded to each of the primary seals 22. For example, the secondary seal 23 is formed by injection molding or the like. The secondary seal 23 is welded to outer surfaces of the primary seals 22.

For example, the primary seals 22 and the secondary seal 23 are formed from a resin such as polypropylene (PP), polyphenylene sulfide (PPS), or modified polyphenylene ether (modified PPE).

Figure 4:
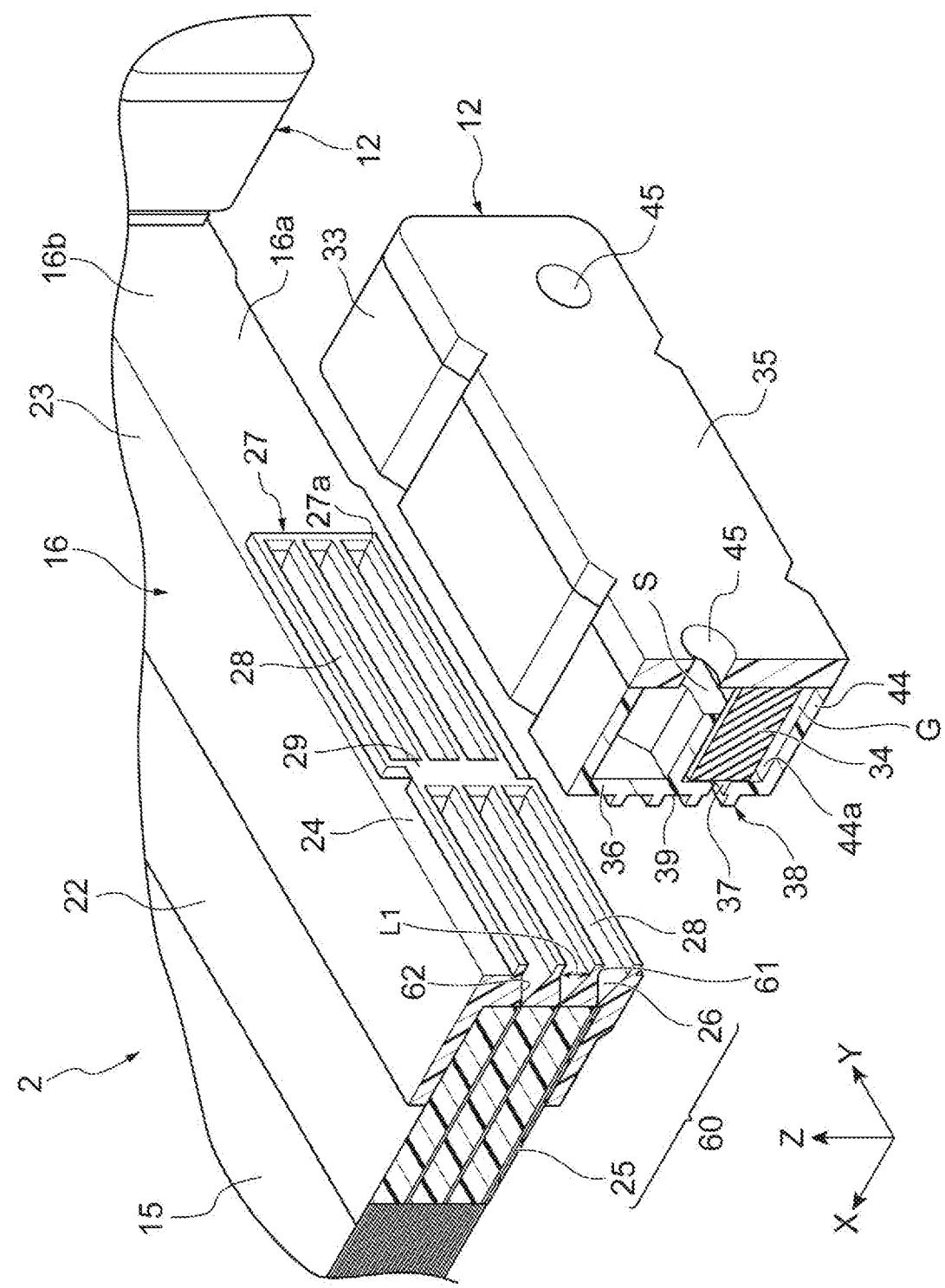
FIG. 4 is a perspective view (including a partial cross-section) illustrating a part of the battery module and the safety valve.
Figure 5:
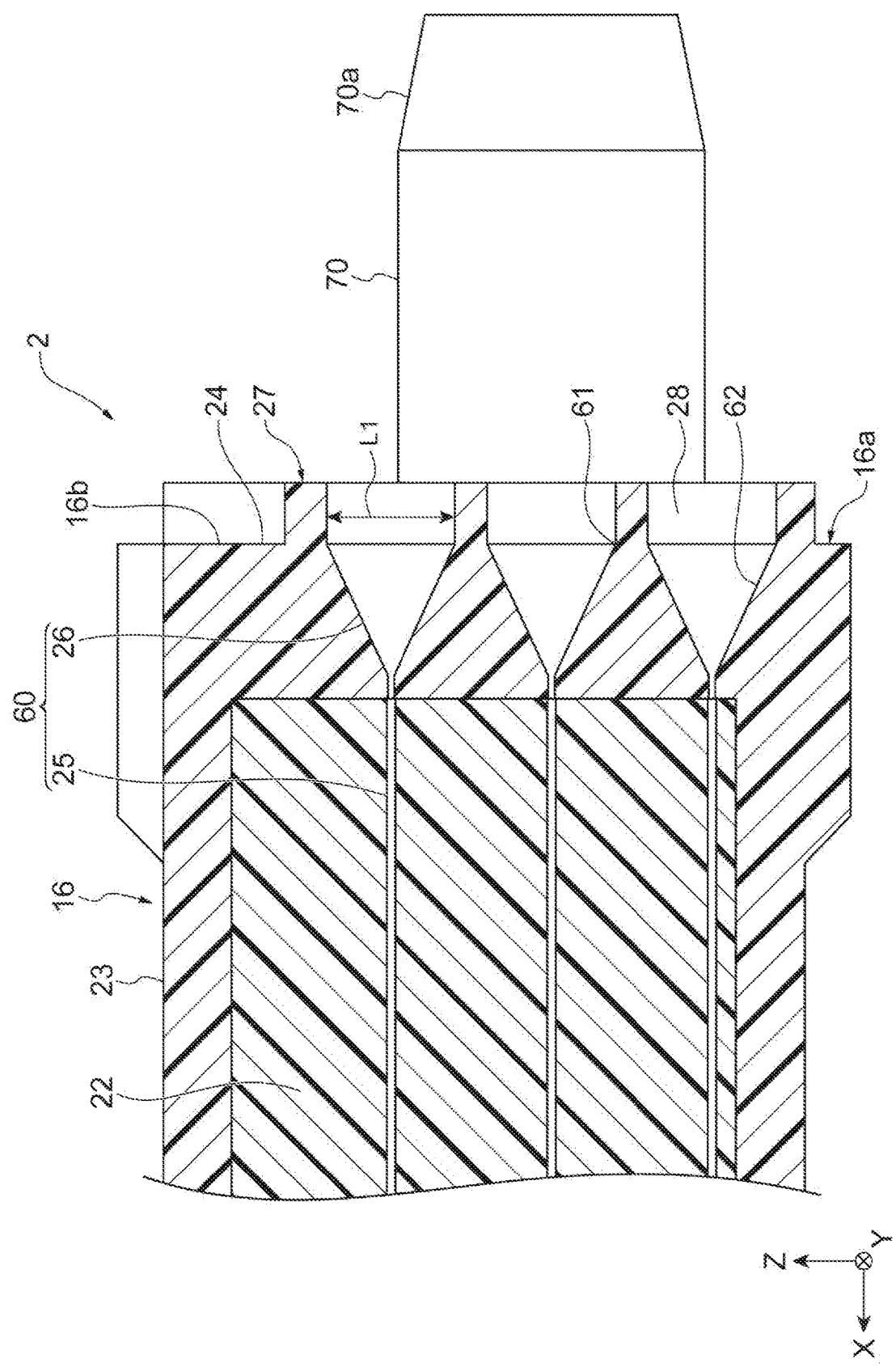
FIG. 5 is a cross-sectional view illustrating a part of the battery module.

FIG. 4 is a perspective view (including a partial cross-section) illustrating a part of the battery module and the safety valve. FIG. 5 is a cross-sectional view illustrating a part of the battery module. As illustrated in FIG. 2 to FIG. 5, the sealing body 16 is provided with a plurality of (here, twenty four) communication holes 60 communicating with internal spaces V different from each other. In this embodiment, the plurality of communication holes 60 are provided in one wall portion 16a that constitutes the sealing body 16. The communication holes 60 extend in a direction (X-axis direction) orthogonal to the laminating direction (Z-axis direction) and an extending direction (Y-axis direction) of the wall portion 16a. The communication holes 60 function as a liquid injection hole for injecting the electrolytic solution into the internal spaces V. After injection of the electrolytic solution, the communication holes 60 function as a flow passage through which a gas generated in the internal spaces V flows.

Each of the communication holes 60 includes one opening end 61 that is opened on an outer surface 16b of the sealing body 16, and the other opening end (not illustrated) that is opened on an inner surface 16c of the sealing body 16. The outer surface 16b is constituted by an outer surface of the secondary seal 23. The inner surface 16c is constituted by inner surfaces of the primary seals 22. The opening end 61 functions as a liquid injection port for injecting the electrolytic solution into the internal spaces V. In a case where the safety valve 12 is attached to the battery module 2, the opening end 61 also functions as a connection port of the safety valve 12. Shapes of the opening ends 61 of the plurality of communication holes 60 match each other.

The communication holes 60 have a rectangular shape in a cross-section cut in a direction orthogonal to the X-axis direction. Each of the communication holes 60 includes a tapered portion 62 in which a length of the communication hole 60 in the laminating direction becomes longer toward the opening end 61 from the internal space V side. A length L1 of the opening end 61 in the laminating direction is longer than a length L2 of the internal space V in the laminating direction. A length of the other end of the communication hole 60 in the laminating direction is equal to or less than the length L2, and is the same as the length L2 as an example.

The communication hole 60 includes a communication hole 25 provided in the primary seal 22, and a communication hole 26 provided in the secondary seal 23. One end of the communication hole 26 constitutes the opening end 61. The other end of the communication hole 26 is connected to one end of the communication hole 25. The other end of the communication hole 25 constitutes the other opening end of the communication hole 60. The communication hole 26 includes the tapered portion 62.

The plurality of communication holes 60 are provided in the wall portion 16a of the sealing body 16 in a state of being divided into a plurality of (here, four) sets. The plurality of communication holes 60 are divided into a plurality of sets in the same number. In this embodiment, the plurality of communication holes 60 are divided into four sets each including six communication holes. In the wall portion 16a of the sealing body 16, a plurality of (here, four) regions 24 provided with the sets of the communication holes 60 are aligned along the edge portion 17c of the nickel foil 17. The regions 24 constitute an attachment region to which the safety valve 12 is attached.

In this embodiment, six communication holes 60 are provided in each of the regions 24. The six communication holes 60 are arranged in two columns and three stages (two columns in the Y-axis direction and three stages in the Z-axis direction) in the region 24. In the region 24, the communication holes 60 in one column are offset from the communication holes 60 in the other column in the laminating direction (Z-axis direction). The four regions 24 are aligned along the extending direction (Y-axis direction) of the wall portion 16a. Accordingly, the communication holes 60 are aligned in eight columns and three stages in the wall portion 16a. In each of the plurality of regions 24, arrangements of the opening ends 61 of the communication holes 60 constituting the sets match each other.

The battery module 2 further includes a plurality of (here, four) protrusions 27 (first protrusions) provided on the outer surface 16b of the sealing body 16, and a pair of protrusions 70 (second protrusions). The plurality of protrusions 27 and the pair of protrusions 70 are formed integrally with the secondary seal 23. The protrusions 27 are provided each of the regions 24. The protrusions 27 are provided in a frame shape along the opening ends 61 of the communication holes 60 on the outer surface 16b in the region 24. The protrusions 27 surround the opening ends 61. The protrusions 27 join the battery module 2 and the safety valve 12. The protrusions 27 form a plurality of (here, six) flow passages 28 through which a gas from the internal spaces V flows in cooperation with the communication holes 60.

The protrusions 27 include a partition wall 29 that partitions the flow passages 28 in one column and the flow passages 28 in the other column. The partition wall 29 linearly extends in the Z-axis direction. A width dimension of the partition wall 29 is greater than a width dimension of a portion other than the partition wall 29 in the protrusions 27.

The pair of protrusions 70 protrude from the outer surface 16b at both end portions of the wall portion 16a in the extending direction (Y-axis direction). The pair of protrusions 70 are spaced apart from the opening ends 61 and are provided outside the regions 24. The pair of protrusions 70 are used for positioning the battery module 2 with respect to a jig 80 (refer to FIG. 8). Each of the protrusions 70 has a cylindrical shape. A tip end portion 70a of the protrusion 70 has a tapered shape so that a cross-sectional area of the tip end portion 70a deceases as it is spaced apart from the outer surface 16b. A protruding length of the protrusion 70 (a length of the protrusion 70 in the X-axis direction) is longer than a protruding length of each of the protrusions 27 (a length of the protrusion 27 in the X-axis direction). The protruding length of the protrusion 70 is set so that the protrusion 70 does not exceed a tip end of the safety valve 12 attached to the sealing body 16 in the X-axis direction.

As illustrated in FIG. 4, the safety valve 12 includes a case 33, a plurality of (here, six) valve main bodies 34, and a cover 35. For example, the case 33 is formed from a resin such as PP, PPS, or modified PPE. The case 33 includes a bottom wall portion 36 including a bottom surface. The bottom wall portion 36 is provided with a plurality of (here, six) communication holes 37 penetrating from the bottom surface toward the cover 35 side. The communication holes 37 respectively communicate with the communication holes 60 of the battery module 2. The communication holes 37 have a circular shape in a cross-section cut in a direction orthogonal to the X-axis direction (refer to FIG. 7).

Figure 7:
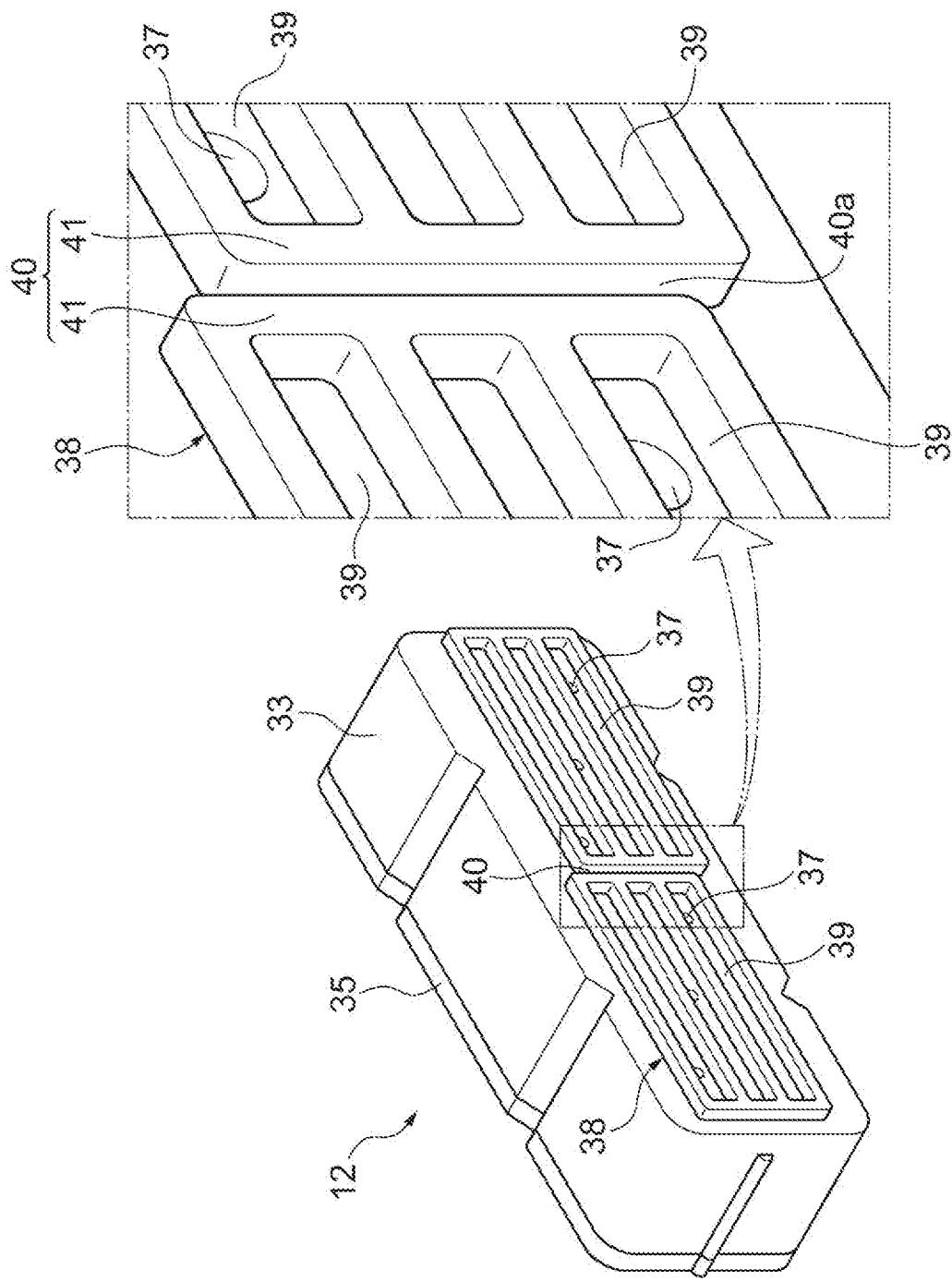
FIG. 7 is a perspective view illustrating a protrusion of the safety valve before joining.

Frame-shaped protrusions 38 are provided on the bottom surface of the case 33 (refer to FIG. 7). The protrusions 38 join the battery module 2 and the safety valve 12. The protrusions 38 form a plurality of (here, six) flow passages 39 through which a gas from each of the internal space V flows. The protrusions 38 are joined to the protrusions 27 of the battery module 2. The protrusions 38 have a shape and dimensions corresponding to the protrusions 27. Accordingly, the flow passages 39 have a rectangular shape in a cross-section cut in a direction orthogonal to the X-axis direction. The flow passages 39 in one column are offset from the flow passages 39 in the other column in the Z-axis direction.

As illustrated in FIG. 7, the protrusions 38 include a partition wall 40 that partitions the flow passages 39 in one column and the flow passages 39 in the other column. Note that, FIG. 7 is a perspective view illustrating the protrusions 38 of the safety valve 12 before being joined to the battery module 2. The partition wall 40 linearly extends in the Z-axis direction. As will be described later, in the safety valve 12 after being attached to the battery module 2, a pair of protrusions 41 are connected to each other, and thus a width dimension of the partition wall 40 is greater than a width dimension of a portion other than the partition wall 40 in the protrusions 38.

As illustrated in FIG. 4, the case 33 includes an inner wall portion 44 that forms a plurality of (here, six) accommodation recesses 44a for accommodating the valve main bodies 34. The inner wall portion 44 is integrated with the bottom wall portion 36. The accommodation recesses 44a have a circular shape in a cross-section cut in a direction orthogonal to the X-axis direction. The accommodation recesses 44a can communicate with the communication holes 37.

The valve main bodies 34 are accommodated in the accommodation recesses 44a to clog the communication holes 37. The valve main bodies 34 are circular-column-shaped member formed from an elastic body such as rubber. Each of the valve main bodies 34 opens and closes each of the communication holes 37. A gap G is provided between an outer surface of the valve main body 34 and an inner wall surface of the inner wall portion 44.

The cover 35 is a plate-shaped member that covers an opening of the case 33. For example, the cover 35 is formed from a resin such as PP, PPS, or modified PPE. The cover 35 is bonded to an opening end surface of the case 33 by heat welding. The cover 35 also functions as a pressing member that presses the plurality of valve main bodies 34 against the bottom wall portion 36 of the case 33. An accommodation space S communicating with the accommodation recesses 44a is provided between the inner wall portion 44 of the case 33 and the cover 35. In addition, a plurality of (here, two) exhaust ports 45 are provided in the cover 35. The exhaust ports 45 communicate with the accommodation space S.

In the safety valve 12, the communication holes 37 of the case 33 communicate with the internal spaces V of the battery module 2 through the communication hole 26 of the secondary seal 23 and the communication hole 25 of the primary seals 22. When a pressure in the internal spaces V is lower than a set pressure, a close valve state in which the communication holes 37 are clogged by the valve main body 34 is maintained. When the pressure in the internal space V rises and becomes equal to or higher than the set pressure, the valve main bodies 34 are elastically deformed to be spaced apart from the bottom wall portion 36, and it enters an open valve state in which clogging of the communication holes 37 is released. As a result, a gas from the internal spaces V is discharged from the exhaust ports 45 through the gap G between the outer surface of the valve main bodies 34 and the inner wall surface of the inner wall portion 44, and the accommodation space S.

Figure 8:
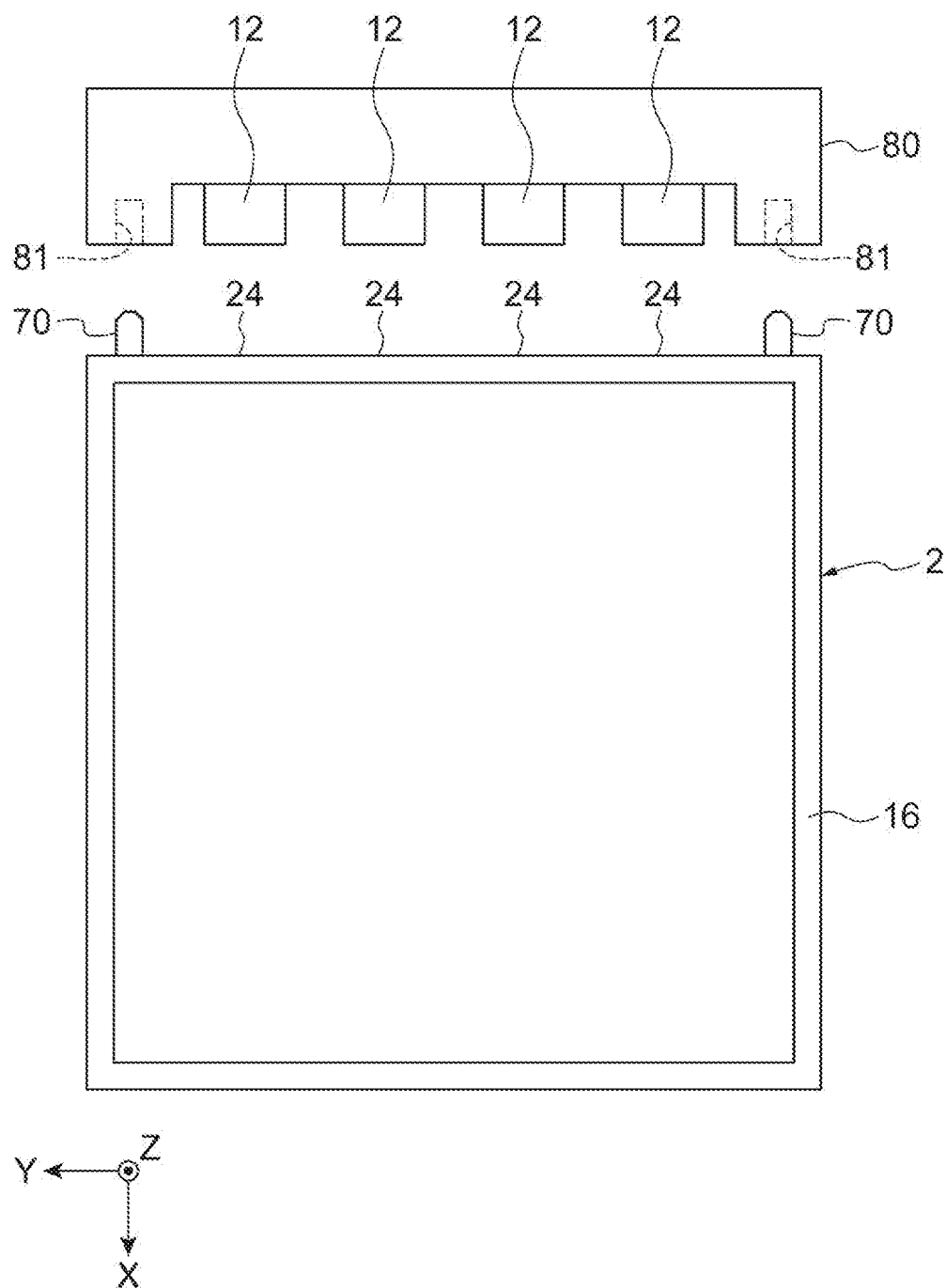
FIG. 8 is a view describing a method for attaching the safety valve to the battery module.

FIG. 8 is a view describing a method of attaching the safety valve 12 to the battery module 2. As illustrated in FIG. 8, a jig 80 is used to attach the safety valve 12. In the jig 80, a plurality of (here, four) safety valves 12 are disposed in correspondence with the plurality of regions 24 of the battery module 2. A pair of concave portions 81 corresponding to the pair of protrusions 70 of the battery module 2 are provided in the jig 80. The concave portions 81 have a circular cross-section.

When the pair of protrusions 70 of the battery module 2 are fitted into the pair of concave portions 81 of the jig 80, each safety valve 12 is disposed in a corresponding region 24. According to this, the protrusions 27 (refer to FIG. 4) of the battery module 2 and the protrusions 38 (refer to FIG. 4) of the safety valve 12 face each other. Using such the jig 80, the protrusions 27 and 38 are joined together by, for example, hot plate welding that is one of heat welding. Accordingly, it is possible to attach the plurality of safety valves 12 to the battery module 2 in a positioned state.

Figure 6:
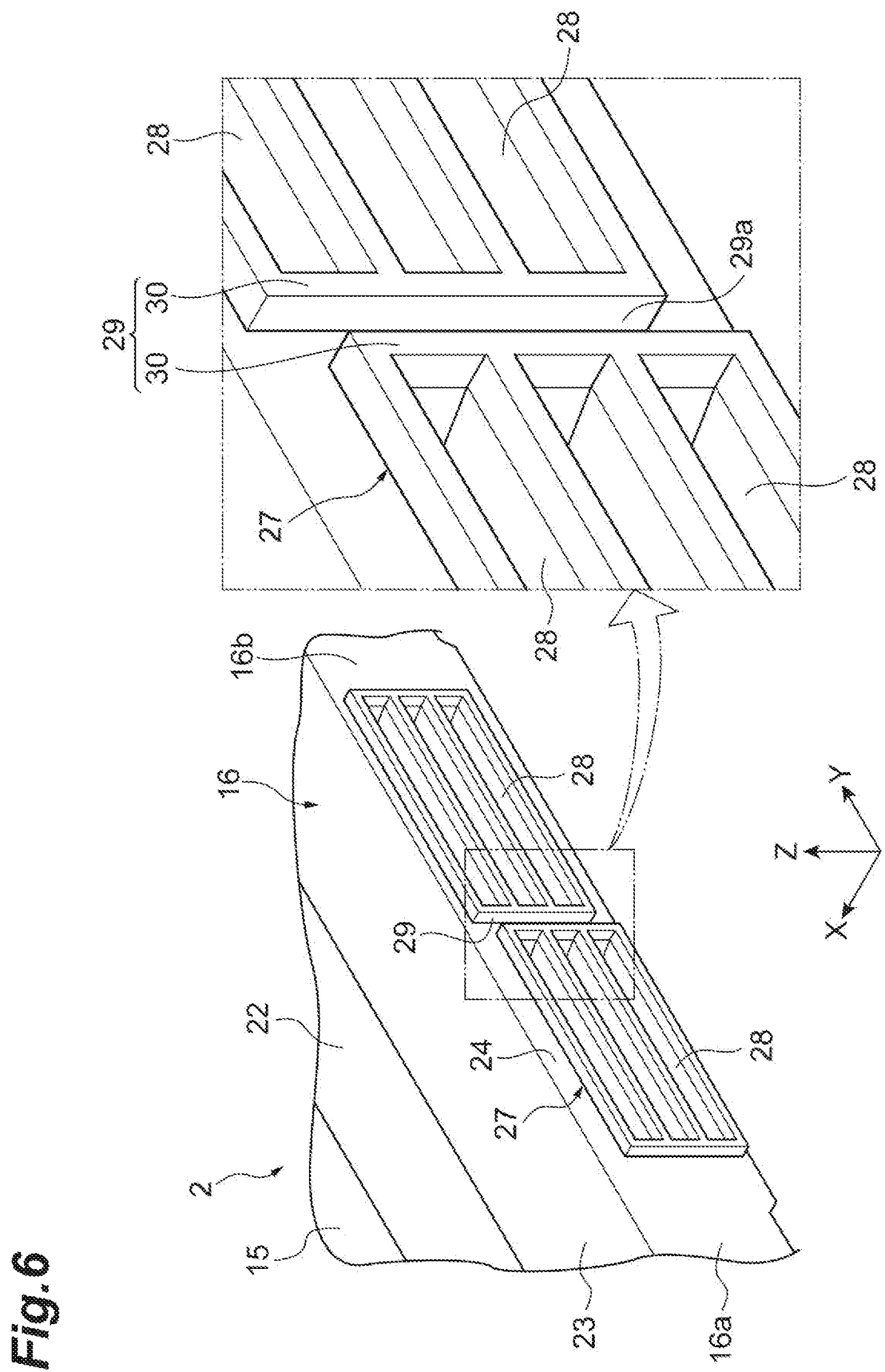
FIG. 6 is a perspective view illustrating a protrusion of a battery module before joining.

As illustrated in FIG. 6, in the battery module 2 before being joined to the safety valves 12, a groove 29a extending along an extending direction of the partition wall 29 is provided in the partition wall 29 of the protrusions 27. Accordingly, the partition wall 29 is constituted by a pair of protrusions 30 extending along the extending direction of the partition wall 29. As illustrated in FIG. 7, in the safety valves 12 before being joined to the battery module 2, a groove 40a extending along an extending direction of the partition wall 40 is provided in the partition wall 40 of the protrusions 38. Accordingly, the partition wall 40 is constituted by a pair of protrusions 41 extending along the extending direction of the partition wall 40.

When the protrusions 27 and 38 are pressed against each other while being melted, the grooves 29a and 40a are filled with the molten resin. Accordingly, in the battery module 2 after the safety valve 12 is attached, as illustrated in FIG. 4, the pair of protrusions 30 are connected to each other. In addition, in the safety valve 12 after being attached to the battery module 2, the pair of protrusions 41 are connected to each other.

As described above, in the battery module 2, the communication holes 60 provided in the sealing body 16 include the opening end 61 on the outer surface 16b of the sealing body 16. In a case where the length L1 of the opening end 61 in the laminating direction is equal to the length L2 of the internal space V in the laminating direction, the size of the opening end 61 of the communication holes 60 becomes approximately slight gap between two pieces of the nickel foil 17. In this case, when providing the safety valves 12, there is a concern that the communication holes 60 may be easily clogged with a molten resin or the like. In the battery module 2, the length L1 of the opening end 61 in the laminating direction is longer than the length L2 of the internal space V in the laminating direction. Accordingly, in comparison to the case where the length L1 is equal to the length L2, it is possible to further suppress clogging of the communication holes 60 when providing the safety valves 12.

Each of the communication holes 60 includes the tapered portion 62 in which the length of communication hole 60 in the laminating direction increases as going toward the opening end 61. According to this, an inner surface of the communication hole 60 can be a smooth surface with few steps or corners. Accordingly, for example, staying of the electrolytic solution at a stepped portion, or the like is suppressed, and thus injection of the electrolytic solution can be easily performed.

The sealing body 16 includes the plurality of primary seals 22 and the secondary seal 23 provided at the periphery of the plurality of primary seals 22. The tapered portion 62 is provided in the secondary seal 23. Accordingly, for example, when forming the secondary seal 23 by injection molding, the tapered portion 62 can be easily formed by using a nest.

The battery module 2 includes the protrusions 27. The safety valve 12 includes the protrusions 38. Accordingly, it is possible to attach the safety valve 12 to the battery module 2 by melting and joining the protrusions 27 and 38 to each other.

The battery module 2 includes the positioning protrusions 70 which are fitted into the concave portions 81 of the jig 80. Accordingly, it is possible to easily position the battery module 2 with respect to the jig 80. In addition, in the protrusions 70, the tip end portion 70a has a tapered shape, and thus the protrusions 70 can be easily inserted into the recesses 81. In addition, the protruding length of each of the protrusions 70 is set so that the protrusion 70 does not exceed the tip end of the safety valve 12 attached to the sealing body 16 in the X-axis direction. According to this, it is possible to suppress an increase in size of the battery module 2 with the safety valve 12.

In the battery module 2, in each of the plurality of regions 24, arrangements of the opening ends 61 of the communication holes 60 constituting sets match each other. Accordingly, the shape of the safety valve 12 attached to the regions 24 can be made common.

The invention is not limited to the above-described embodiment, and various modifications can be made.

Figure 9:
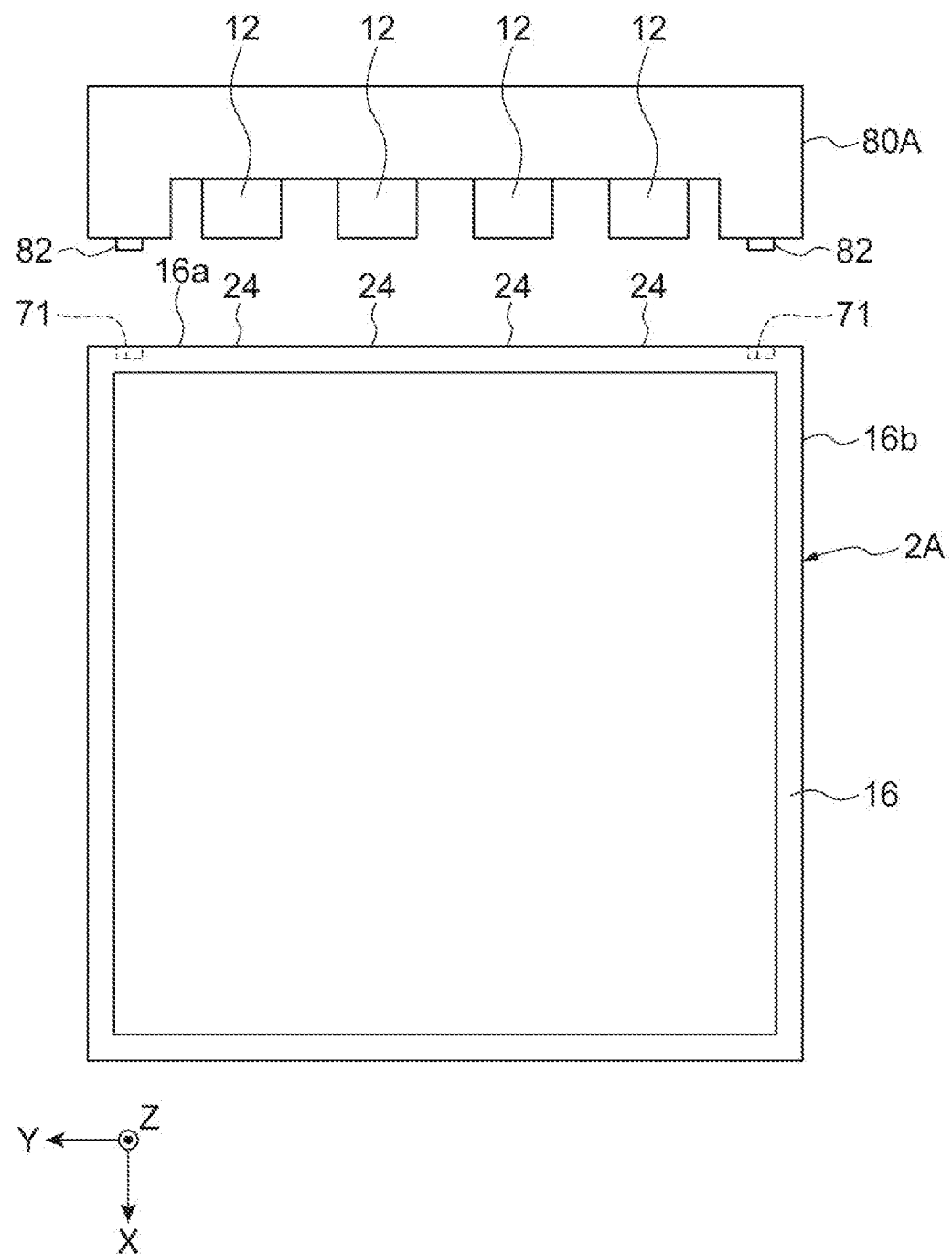
FIG. 9 is a view describing a method for attaching the safety valve to a battery module according to a modification example.

FIG. 9 is a view describing a method of attaching the safety valve 12 to a battery module 2A according to a modification example. As illustrated in FIG. 9, a pair of recesses 71 recessed from the outer surface 16b along the X-axis direction may be provided in the wall portion 16a of the sealing body 16 instead of the pair of protrusions 70 (refer to FIG. 3). The pair of recesses 71 are spaced apart from the opening end 61. The recesses 71 do not penetrate through the sealing body 16. That is, the recesses 71 do not communicate with the internal spaces V. A length of the recesses 71 in the X-axis direction (a depth of the recesses 71) is shorter than a length between the outer surface 16b and the inner surface 16c of the sealing body 16 in the X-axis direction.

A pair of protrusions 82 are provided in a jig 80A in correspondence with the pair of recesses 71 of the battery module 2A instead of the pair of recesses 81. The pair of protrusions 82 are fitted into the pair of recesses 71. According to this, each safety valve 12 is disposed in a corresponding region 24. In this manner, since the battery module 2A is provided with the positioning recesses 71 into which the protrusions 82 of the jig 80A are fitted, it is possible to easily position the battery module 2A with respect to the jig 80A. As a result, it is possible to easily perform alignment between the battery module 2A and the plurality of safety valves 12.

In the embodiment, the protrusions 70 have a cylindrical shape, but may have a circular column shape. However, when the protrusions 70 have a tubular shape such as the cylindrical shape, it is possible to reduce a shrinkage amount of a resin.

In the embodiment, the protrusions 70 have the cylindrical shape, and the recesses 81 have a circular cross-section. However, there is no particular limitation to this aspect, and the protrusions 70 may have a polygonal tube shape or a polygonal column shape and the recesses 81 may have a polygonal cross-section. However, in a case where the shape of the protrusions 70 is set to the cylindrical shape or the circular column shape, and the recesses 81 is set to have the circular cross-section, it is advantageous from the viewpoint of processing the protrusions 70 and the recesses 81. Similarly, the protrusions 82 may have a polygonal tube shape or a polygonal column shape and the recesses 71 may have a polygonal cross-section. However, in a case where the shape of the protrusions 82 is set to the cylindrical shape or the circular column shape and the recesses 71 is set to have the circular cross-section, it is advantages from the viewpoint of processing the protrusions 82 and the recesses 71.

In the embodiment, the number of the protrusions 70 and the number of recesses 81 are set to two, but the number of the protrusions 70 and the number of the recesses 81 may be set to one or three or more without particular limitation to two. In a case where one protrusion 70 and one recess 81 are provided, the shape of the protrusion 70 may be set to a polygonal tube shape or a polygonal column shape, and the recess 81 may be set to have a polygonal cross-section. According to this, it is possible to accurately position the battery module 2 and the safety valves 12 in biaxial directions. The pair of protrusions 70 and the pair of recesses 81 may be provided for each of the regions 24. In this case, it is possible to further accurately position the battery module 2 and the safety valves 12.

Similarly, the number of the protrusions 82 and the number of the recesses 71 are not particularly limited to two, and may be one or three or more. In a case where one protrusion 82 and one recess 71 are provided, the shape of the protrusion 82 may be set to a polygonal tube shape or a polygonal column shape, and the recess 71 may be set to have a polygonal cross-section. According to this, it is possible to accurately position the battery module 2 and the safety valves 12 in biaxial directions. The pair of protrusions 82 and the pair of recesses 71 may be provided for each of the regions 24. In this case, it is possible to further accurately position the battery module 2 and the safety valves 12.

In the embodiment, the protrusions 27 are provided in the battery module 2, and the protrusions 38 are provided in the safety valves 12, but there is no particular limitation to this aspect. Joining protrusions may be provided only in either the battery module 2 or the safety valves 12.

In the embodiment, the communication holes 60 include the tapered portion 62. However, there is no particular limitation to this aspect. The length L1 of the opening end 61 in the laminating direction may be longer than the length L2 of the internal space V in the laminating direction in the communication holes 60. That is, the communication holes 60 may include a portion in which a length of the communication holes 60 in the laminating direction gradually increases in one or more steps as going toward the opening end 61 from the internal space V instead of the tapered portion 62.

In the embodiment, the battery module 2 and the safety valves 12 are joined to each other by the hot plate welding, but there is no particular limitation to this aspect. For example, the battery module 2 and the safety valves 12 may be joined by ultrasonic heat welding.

In the embodiment, the battery module 2 is a nickel-hydrogen secondary battery, but the invention is not particularly limited to the nickel-hydrogen secondary battery. The invention is also applicable to a lithium ion secondary battery and the like. In addition to the battery module 2, the invention is applicable to a battery module as long as the battery module includes an electrode laminate in which a plurality of electrodes are laminated and a sealing body that seals a side surface of the electrode laminate.

REFERENCE SIGNS LIST 2, 2A: battery module, 12: safety valve, 13: bipolar electrode (electrode), 15: electrode laminate, 17c: edge portion, 15a: side surface, 16: sealing body, 16b: outer surface, 22: primary seal, 23: secondary seal, 24: region, 27: protrusion (first protrusion), 60: communication hole, 61: opening end, 62: tapered portion, 70: protrusion (second protrusion), 71: recess, V: internal space.

The invention claimed is:

1. A battery module comprising:
    an electrode laminate including a plurality of electrodes that are laminated; and
    a sealing body sealing a side surface of the electrode laminate,
    wherein the sealing body is provided with a communication hole communicating an internal space between the electrodes adjacent in a laminating direction in the electrode laminate,
    the communication hole includes an opening end on an outer surface of the sealing body, and
    a length of the opening end in the laminating direction is longer than a length of the internal space in the laminating direction.

2. The battery module according to claim 1,
    wherein the communication hole includes a tapered portion in which the length of the communication hole in the laminating direction becomes longer toward the opening end.

3. The battery module according to claim 2,
    wherein the sealing body includes a plurality of primary seals respectively provided in edge portions of the electrodes, and a secondary seal provided around the plurality of primary seals, and
    the tapered portion is provided in the secondary seal.

4. The battery module according to claim 1, further comprising:
    a first protrusion provided on the outer surface along the opening end.

5. The battery module according to claim 1, further comprising:
    a second protrusion spaced apart from the opening end and protruding from the outer surface.

6. The battery module according to claim 1,
    wherein the sealing body is provided with a recess that is spaced apart from the opening end and is recessed from the outer surface.

7. The battery module according to claim 1,
    wherein the sealing body is provided with a plurality of the communication holes communicating with a plurality of the internal spaces different from each other in a manner of dividing into a plurality of sets,
    in the sealing body, regions in which the sets of the communication holes are provided are aligned along edge portions of the electrodes, and
    in the regions, arrangements of a plurality of the opening ends of the communication holes constituting the sets match each other.

8. The battery module according to claim 2, further comprising:
    a first protrusion provided on the outer surface along the opening end.

9. The battery module according to claim 3, further comprising:
    a first protrusion provided on the outer surface along the opening end.

10. The battery module according to claim 2, further comprising:
    a second protrusion spaced apart from the opening end and protruding from the outer surface.

11. The battery module according to claim 3, further comprising:
    a second protrusion spaced apart from the opening end and protruding from the outer surface.

12. The battery module according to claim 4, further comprising:
- a second protrusion spaced apart from the opening end and protruding from the outer surface.

13. The battery module according to claim 2,
wherein the sealing body is provided with a recess that is spaced apart from the opening end and is recessed from the outer surface.

14. The battery module according to claim 3,
wherein the sealing body is provided with a recess that is spaced apart from the opening end and is recessed from the outer surface.

15. The battery module according to claim 4,
wherein the sealing body is provided with a recess that is spaced apart from the opening end and is recessed from the outer surface.

16. The battery module according to claim 2,
wherein the sealing body is provided with a plurality of the communication holes communicating with a plurality of the internal spaces different from each other in a manner of dividing into a plurality of sets,
in the sealing body, regions in which the sets of the communication holes are provided are aligned along edge portions of the electrodes, and
in the regions, arrangements of a plurality of the opening ends of the communication holes constituting the sets match each other.

17. The battery module according to claim 3,
wherein the sealing body is provided with a plurality of the communication holes communicating with a plurality of the internal spaces different from each other in a manner of dividing into a plurality of sets,
in the sealing body, regions in which the sets of the communication holes are provided are aligned along edge portions of the electrodes, and
in the regions, arrangements of a plurality of the opening ends of the communication holes constituting the sets match each other.

18. The battery module according to claim 4,
wherein the sealing body is provided with a plurality of the communication holes communicating with a plurality of the internal spaces different from each other in a manner of dividing into a plurality of sets,
in the sealing body, regions in which the sets of the communication holes are provided are aligned along edge portions of the electrodes, and
in the regions, arrangements of a plurality of the opening ends of the communication holes constituting the sets match each other.

19. The battery module according to claim 5,
wherein the sealing body is provided with a plurality of the communication holes communicating with a plurality of the internal spaces different from each other in a manner of dividing into a plurality of sets,
in the sealing body, regions in which the sets of the communication holes are provided are aligned along edge portions of the electrodes, and
in the regions, arrangements of a plurality of the opening ends of the communication holes constituting the sets match each other.

20. The battery module according to claim 6,
wherein the sealing body is provided with a plurality of the communication holes communicating with a plurality of the internal spaces different from each other in a manner of dividing into a plurality of sets,
in the sealing body, regions in which the sets of the communication holes are provided are aligned along edge portions of the electrodes, and
in the regions, arrangements of a plurality of the opening ends of the communication holes constituting the sets match each other.

* * * * *